United States Patent
Kim et al.

(10) Patent No.: US 12,103,014 B2
(45) Date of Patent: Oct. 1, 2024

(54) FINE DUST COLLECTING FILTER DEVICE

(71) Applicants: Research & Business Foundation Sungkyunkwan University, Suwon-si (KR); SAMSUNG LIFE PUBLIC WELFARE FOUNDATION, Seoul (KR)

(72) Inventors: SangWoo Kim, Yongin-si (KR); Byung Ok Choi, Seoul (KR); Min Ki Kang, Suwon-si (KR); Jeong Hwan Lee, Gumi-si (KR); Young Jun Kim, Daejeon (KR); In Yong Suh, Suwon-si (KR)

(73) Assignees: Research & Business Foundation Sungkyunkwan University, Suwon-si (KR); SAMSUNG LIFE PUBLIC WELFARE FOUNDATION, Seoul (KR)

( * ) Notice: Subject to any disclaimer, the term of this patent is extended or adjusted under 35 U.S.C. 154(b) by 587 days.

(21) Appl. No.: 17/380,066

(22) Filed: Jul. 20, 2021

(65) Prior Publication Data

US 2022/0023882 A1 Jan. 27, 2022

(30) Foreign Application Priority Data

Jul. 23, 2020 (KR) .......................... 10-2020-0091347

(51) Int. Cl.
*B03C 3/66* (2006.01)
*A62B 23/02* (2006.01)
(Continued)

(52) U.S. Cl.
CPC ................ *B03C 3/66* (2013.01); *A62B 23/02* (2013.01); *B01D 46/0032* (2013.01);
(Continued)

(58) Field of Classification Search
CPC ...... A62B 23/02; B01D 46/0032; B03C 3/66; B03C 3/155; B03C 3/32; B03C 3/41;
(Continued)

(56) References Cited

U.S. PATENT DOCUMENTS 3,581,462 A * 6/1971 Stump ..................... B03C 3/155
96/99
8,426,055 B2 * 4/2013 Choi ....................... H01M 6/42
429/156

(Continued)

FOREIGN PATENT DOCUMENTS

JP H0928825 A * 2/1997
JP H11333008 A * 12/1999
(Continued)

OTHER PUBLICATIONS

Korean Office Action issued on Oct. 27, 2021 in counterpart Korean Patent Application No. 10-2020-0091347 (7 pages in Korean).

*Primary Examiner* — Christopher P Jones
*Assistant Examiner* — Sonji Turner
(74) *Attorney, Agent, or Firm* — NSIP Law

(57) ABSTRACT

Disclosed is a fine dust collecting device using a human body based electrostatic energy harvesting element. The fine dust collecting filter device includes an electrostatic energy harvesting element for collecting and generating current; a charging filter connected to the electrostatic energy harvesting element such that the charging filter is electrically charged to have a first polarity and thus electrically charges fine dust particles; a collecting filter connected to the electrostatic energy harvesting element such that the collecting filter is electrically charged to have a second polarity opposite to the first polarity; and a rectifier disposed between and connected to the electrostatic energy harvesting element, and the charging filter and the collecting filter.

15 Claims, 6 Drawing Sheets

(51) Int. Cl.
- B01D 46/00 (2022.01)
- B03C 3/155 (2006.01)
- B03C 3/32 (2006.01)
- B03C 3/41 (2006.01)
- B03C 3/45 (2006.01)
- H02M 7/06 (2006.01)
- H02N 1/08 (2006.01)

(52) U.S. Cl.
CPC ............... B03C 3/155 (2013.01); B03C 3/32 (2013.01); B03C 3/41 (2013.01); B03C 3/45 (2013.01); H02N 1/08 (2013.01); *H02M 7/06* (2013.01)

(58) Field of Classification Search
CPC .. B03C 3/45; B03C 3/017; B03C 3/12; B03C 3/47; B03C 3/60; B03C 3/38; C09D 1/00; H02M 7/06; H02N 1/08
See application file for complete search history.

(56) References Cited

U.S. PATENT DOCUMENTS

| | | | |
|---|---|---|---|
| 9,793,828 B2 * | 10/2017 | Masaki | H02N 1/10 |
| 9,913,998 B2 * | 3/2018 | Cheung | B03C 3/30 |
| 10,675,489 B2 * | 6/2020 | Cheung | B03C 3/28 |
| 2017/0317609 A1 * | 11/2017 | Kim | H02N 1/04 |
| 2017/0331396 A1 * | 11/2017 | Byun | H02N 1/04 |

FOREIGN PATENT DOCUMENTS

| | | | | |
|---|---|---|---|---|
| JP | 2008-221078 A | | 9/2008 | |
| KR | 20130063365 A | * | 6/2013 | |
| KR | 10-2016-0066938 A | | 6/2016 | |
| KR | 20160066938 A | * | 6/2016 | |
| KR | 10-1684860 B1 | | 12/2016 | |
| KR | 20170108495 A | * | 9/2017 | |
| KR | 10-1796185 B1 | | 11/2017 | |
| KR | 10-1815757 B1 | | 1/2018 | |
| KR | 10-2043167 B1 | | 11/2019 | |
| WO | WO 2016089046 A1 | * | 6/2016 | H01B 1/20 |

* cited by examiner

Fabrication of charging filter

Fabrication of collecting filter

1. Basic configuration

2. Stack configuration

3. Including mechanical filter

4. Combination of mechanical filter and stack configuration

▇ collecting filter　▧ charging filter　▧ mechanical filter

FINE DUST COLLECTING FILTER DEVICE

CROSS REFERENCE TO RELATED APPLICATIONS

This application claims the benefit under 35 USC § 119(a) of Korean Patent Application No. 10-2020-0091347, filed on Jul. 23, 2020, in the Korean Intellectual Property Office, the entire disclosure of which is incorporated herein by reference for all purposes.

BACKGROUND

Field

The present disclosure relates to a fine dust collecting filter device, and specifically intends to provide a fine dust collecting scheme using human body based electrostatic energy harvesting according to the present disclosure.

Description of Related Art

Recently, fine dusts and ultra-fine dusts have become a global environmental problem. Influx of the fine dusts into a human body has a very harmful effect on the human body, such as causing respiratory diseases. Thus, a lot of research is being done to reduce the fine dusts.

In recent studies, it is reported that a significant portion of domestic fine dusts results from fine dust from China. Even when such fine dusts originating from China is excluded, it is urgent to prepare countermeasures for the fine dust that occurs worldwide.

A conventional fine dust collecting scheme includes a mechanical filter scheme and an electrostatic filter scheme. The mechanical filter scheme collects fine dusts by passing air through a filter composed of densely arranged fibers. The mechanical filter has a number of filters based on particle sizes. A pressure loss is large as a pore size of the filter decreases. Motor overload and large power consumption are required to prevent such pressure loss.

In addition, the electrostatic filter scheme maximizes a collecting power by electrically charging a charge on a filter surface using corona discharge. This scheme is able to collect very small ultra-fine dusts at low pressure loss and at high efficiency, but is vulnerable to moisture. Further, as the charge is discharged, the collecting efficiency decreases and a lifespan thereof is limited to a duration shorter than one day.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a fine dust collecting scheme that continuously charges a filter using a human body based electrostatic energy harvesting scheme that generates an electric current using static electricity generated in the human body, and thus operates at all times.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

A first aspect of the present disclosure provides a fine dust collecting filter device comprising: an electrostatic energy harvesting element for collecting and generating current; a charging filter connected to the electrostatic energy harvesting element such that the charging filter is electrically charged to have a first polarity and thus electrically charges fine dust particles; a collecting filter connected to the electrostatic energy harvesting element such that the collecting filter is electrically charged to have a second polarity opposite to the first polarity; and a rectifier disposed between and connected to the electrostatic energy harvesting element, and the charging filter and the collecting filter, wherein the electrically charged fine dust particles from the charging filter are collected into the collecting filter due to the second polarity thereof.

In one implementation, the electrostatic energy harvesting element includes: an electrode attached to a body skin; and a connection circuit connected to and disposed between the electrode and the rectifier, wherein as the skin comes into contact with an external substance, the skin is electrically charged to have a polarity opposite to a polarity of the external substance, wherein a potential difference generated as the skin is separated from the external substance causes polarization of the body under electrostatic induction, thereby allowing the electrode to have a charge of a polarity opposite to a polarity of the skin, and thus generating a current through the connection circuit.

In one implementation, the electrostatic energy harvesting element includes: an electrode attached to a body skin; a connection circuit connected to and disposed between the electrode and the rectifier; and an electrostatic amplifier attached to a portion of the body that comes into contact with an external substance; wherein as the electrostatic amplifier comes into contact with the external substance, a surface portion of the electrostatic amplifier in contact with the external substance is electrically charged to have a polarity opposite to a polarity of the external substance, wherein a potential difference generated as the electrostatic amplifier is separated from the external substance causes polarization of the body under electrostatic induction, thereby allowing the electrode to have a charge of a polarity opposite to a polarity of the surface portion, and thus generating a current through the connection circuit.

In one implementation, the electrostatic amplifier is made of at least one of polytetrafluoroethylene, polyfluoroalkoxy, polyurethane, and butylated melamine resin, In one implementation, the electrode has a portion attached to the skin and made of a non-conductive coating.

In one implementation, the electrode has a portion attached to an external substance and made of a non-conductive coating.

In one implementation, the electrode is patterned to have a plurality of sub-electrodes arranged in a line and spaced from each other by a regular spacing, such that parasitic capacitance is generated between the sub-electrodes to increase a total capacitance of the electrode, thereby maximizing an output current.

In one implementation, the plurality of sub-electrodes are arranged in a direction perpendicular to a length direction of each sub-electrode.

In one implementation, the charging filter is prepared by providing filter fibers, and coating a conductive material on the filter fibers.

In one implementation, the charging filter is prepared by immersing the filter fibers in a Ti(O-i-Pr)$_4$ solution for catalytic treatment, and then immersing the filter fibers in an aluminum precursor AlH$_3$(O(C$_4$H$_9$)$_2$) solution such that aluminum is coated on the filter fibers.

In one implementation, the collecting filter is prepared by providing filter fibers, and then, coating a conductive material on the filter fiber with, and then additionally coating a dielectric material on the conductive material.

In one implementation, the collecting filter is prepared by coating aluminum on the filter fibers, then immersing the filter fibers in a PVDF/DMF 20 wt % solution for dip-coating, and drying the filter fibers at 80° C. for 30 minutes, and heat-treating the filter fibers at 140° C. for 2 hours.

In one implementation, the device further comprises a mechanical filter disposed on one face or each of both opposing faces of the device.

A second aspect of the present disclosure provides a filter stack in which a plurality of fine dust collecting filter devices are stacked, wherein each fine dust collecting filter device includes the device as defined above.

A third aspect of the present disclosure provides a mask comprising the fine dust collecting filter device as defined above.

According to the present disclosure, a new concept of a fine dust collecting scheme which may overcome the limitations of the conventional fine dust collecting scheme, such as the short lifespan and the large pressure loss, and may operate at all times may be realized.

Effects of the present disclosure are not limited to the above-mentioned effects, and other effects as not mentioned will be clearly understood by those skilled in the art from following descriptions.

DETAILED DESCRIPTIONS

Figure 1:
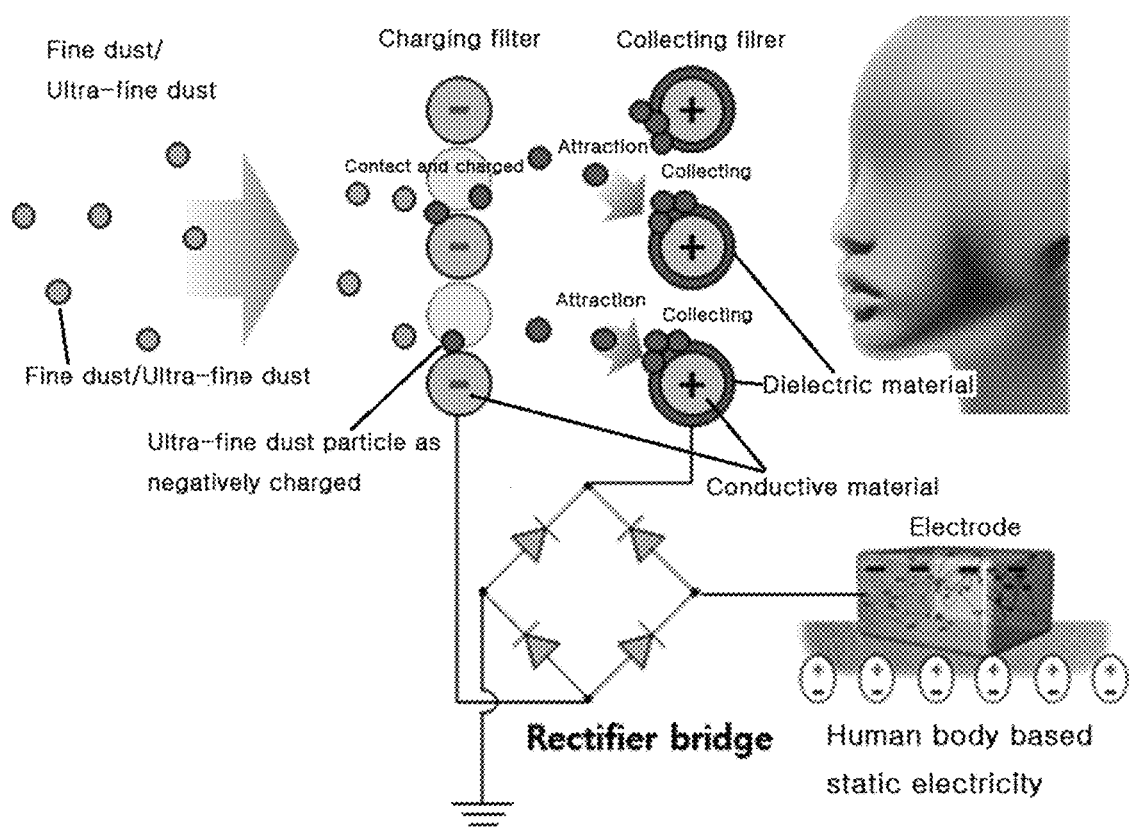
FIG. 1 shows a configuration and an operation principle of a fine dust collecting filter device using a human body based electrostatic energy harvesting scheme according to one embodiment of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for describing an embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the present disclosure may be partially or entirely combined with each other, and may be technically associated with each other or operate with each other. The embodiments may be implemented independently of each other and may be implemented together in an association relationship. Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the drawings is turned over, elements described as "below" or "beneath" or "under" other elements or features would then be oriented "above" the other elements or features. Thus, the example terms "below" and "under" may encompass both an orientation of above and below. The device may be otherwise oriented for example, rotated 90 degrees or at other orientations, and the spatially relative descriptors used herein should be interpreted accordingly.

The present disclosure proposes a fine dust collecting scheme that electrically charges fine dust particles by electrically charging a filter surface using a human body based electrostatic energy harvesting scheme and collects the electrically charged fine dust particles using electrostatic attraction.

The human body generates static electricity when it comes into contact with various objects around the body. The body is composed of dielectric materials such as bones and epidermis, and conductive materials such as extracellular matrix and body fluids, and thus has the characteristics of a capacitor that may store charges therein and thus may accumulate the static electricity or transfer a potential difference generated in a local area of the human body via polarization. When an electrode is attached to the epidermis of the human body, a potential difference due to static electricity and polarization may be transmitted to the electrode, thereby inducing charges in the electrode, such that current flows through an externally connected circuit.

FIG. 1 shows a configuration and an operation principle of a fine dust collecting filter device using a human body based electrostatic energy harvesting scheme according to one embodiment of the present disclosure.

A fine dust collecting filter device according to one embodiment of the present disclosure includes an electrostatic energy harvesting element for collecting and generating current; a charging filter connected to the electrostatic energy harvesting element such that the charging filter is electrically charged to have a first polarity and thus electrically charges fine dust particles; a collecting filter connected to the electrostatic energy harvesting element such that the collecting filter is electrically charged to have a second polarity opposite to the first polarity; and a rectifier disposed between and connected to the electrostatic energy harvesting element, and the charging filter and the collecting filter, wherein the electrically charged fine dust particles from the charging filter are collected into the collecting filter due to the second polarity thereof.

In accordance with the present disclosure, the electrostatic energy harvesting element may include a human body based electrostatic energy harvesting element.

Figure 2:
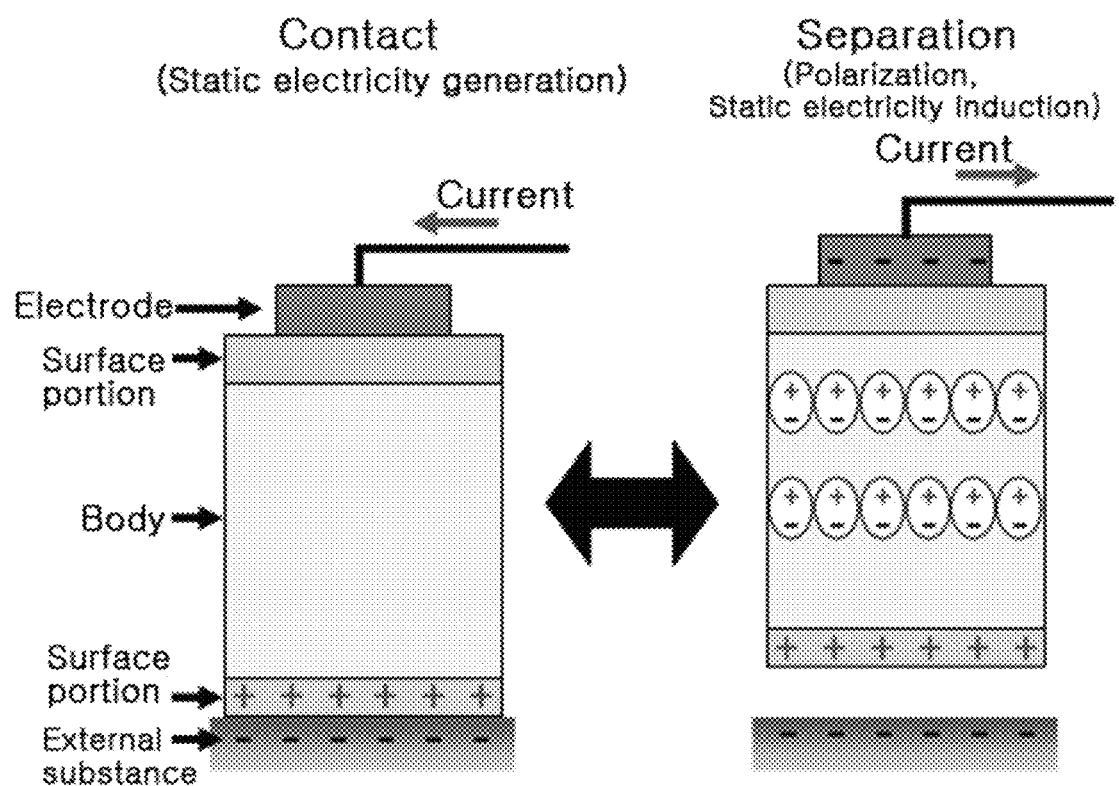
FIG. 2 is a schematic diagram showing an operation principle of a human body based electrostatic energy harvesting scheme according to one embodiment of the present disclosure.

FIG. 2 is a schematic diagram showing an operation principle of the human body based electrostatic energy harvesting scheme according to one embodiment of the present disclosure.

The electrostatic energy harvesting element according to one embodiment of the present disclosure may include an electrode attached to a body skin; a connection circuit connected to and disposed between the electrode and the rectifier; and an electrostatic amplifier attached to a portion of the body that comes into contact with an external substance.

As the electrostatic amplifier comes into contact with the external substance, a surface portion of the electrostatic amplifier in contact with the external substance is electrically charged to have a polarity opposite to a polarity of the external substance, wherein a potential difference generated as the electrostatic amplifier is separated from the external substance causes polarization of the body under electrostatic induction, thereby allowing the electrode to have a charge of a polarity opposite to a polarity of the surface portion, and thus generating a current through the connection circuit.

The electrode may be made of an electrode material itself, or may have a non-conductive material coated thereon as described below.

All of materials having conductivity such as metals such as gold, silver, and aluminum, conductive polymers, conductive hydrogels, and conductive ceramics may be applied to the electrode. The electrode may have a non-conductor coated thereon, may have a stack structure to maximize electrostatic induction. The electrode may generate an output current when being attached to any epidermal portion of the body, and/or may generate an output current even when being inserted into the body such that an in-body energy harvesting scheme is realized.

The electrostatic amplifier may be attached to a part of the body that comes into contact with an external substance, and may be made of a material that may amplify the electrostatic induction. When the wearer of the amplifier having a typing, and a hand tapping thereof moves, walks, runs, sits and stands up, the body and the external substance come into contact with each other and are separated from each other. Thus, an electric current is generated according to the transfer of the potential difference due to electrostatic accumulation and polarization. When the electrostatic amplifier made of a material capable of amplifying an electrostatic phenomenon is attached to a body portion, the current collected via amplifying the electrostatic phenomenon may be increased.

In another embodiment not using the electrostatic amplifier, the electrostatic energy harvesting element includes an electrode attached to a body skin; and a connection circuit connected to and disposed between the electrode and the rectifier, wherein as the skin comes into contact with an external substance, the skin is electrically charged to have a polarity opposite to a polarity of the external substance, wherein a potential difference generated as the skin is separated from the external substance causes polarization of the body under electrostatic induction, thereby allowing the electrode to have a charge of a polarity opposite to a polarity of the skin, and thus generating a current through the connection circuit.

The rectifier rectifies the output current generated using the human body based electrostatic energy harvesting scheme. For example, a rectifier bridge may be used as the rectifier. The output current may be rectified through the rectifier so that the charging filter and the collecting filter may be charged to have opposite polarities. In some cases, the rectifier bridge may include a rectifying circuit element such as a semiconductor rectifier and an inductor.

The connection circuit connects the electrode to an external circuit and includes, for example, a lead wire, etc. The connection circuit may refer to a part between the electrode and the rectifier. However, this connection circuit may be interpreted as a concept meaning a circuit that connects the rectifier, the filter, and the electrode to each other.

A magnitude of the output current may vary depending on a magnitude and a polarization level of the generated static electricity. For this purpose, the electrostatic amplifier may be used. The electrostatic amplifier may be made of at least one of polytetrafluoroethylene, polyfluoroalkoxy, polyurethane, and butylated melamine resin.

The electrostatic energy harvesting element according to the present disclosure may use a following operation principle: as the electrostatic amplifier comes into contact with the external substance, a surface portion of the electrostatic amplifier in contact with the external substance is electrically charged to have a polarity opposite to a polarity of the external substance, wherein a potential difference generated as the electrostatic amplifier is separated from the external substance causes polarization of the body under electrostatic induction, thereby allowing the electrode to have a charge of a polarity opposite to a polarity of the surface portion, and thus generating a current through the connection circuit.

Referring to FIG. 2, the operation principle of the human body based electrostatic energy harvesting scheme according to the present disclosure is further described. As the surface portion and the external substance come into contact with each other, they are charged to have opposite polarities. A potential difference generated as the surface portion is separated from the external substance causes polarization of the body under electrostatic induction, thereby allowing the electrode to have a charge of a polarity opposite to a polarity of the surface portion, and thus generating a current through the connection circuit. As the two layers come into contact with each other, a larger amount of charges is accumulated and the current is generated in the opposite direction to generate an alternating current.

Figure 3:
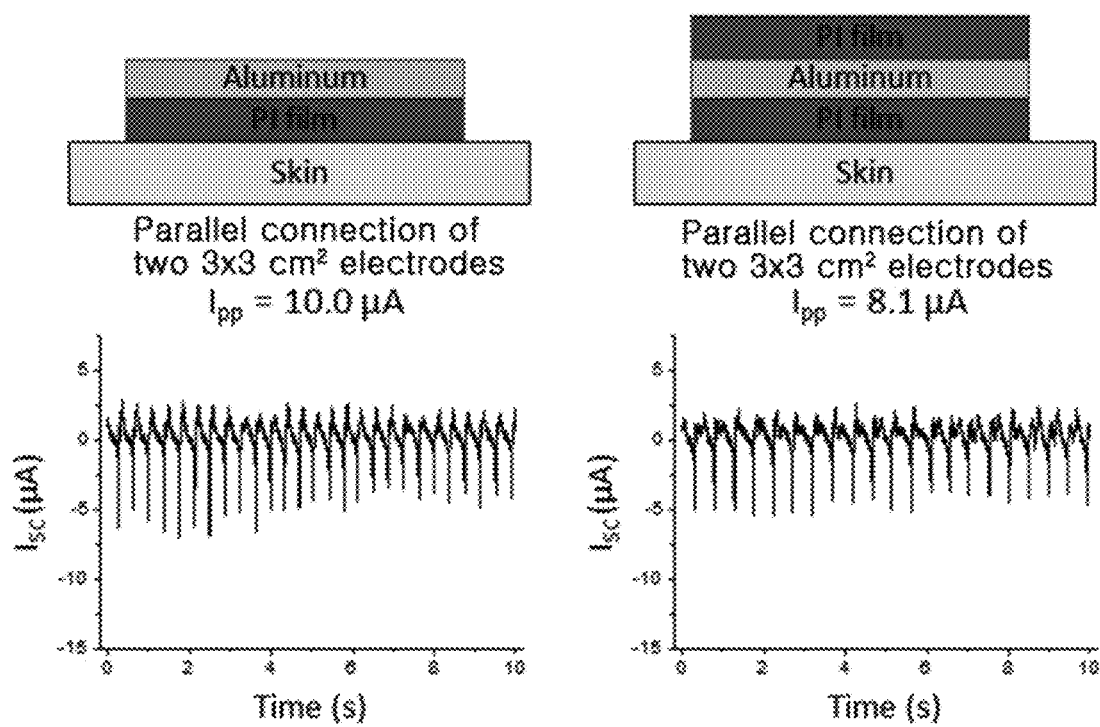
FIG. 3 shows an embodiment of an electrode having an insulator coated thereon according to a further embodiment of the present disclosure.

FIG. 3 shows an embodiment of an electrode having an insulator coated thereon according to a further embodiment of the present disclosure.

As shown in FIG. 3, the electrode has a portion attached to the skin and made of a non-conductive coating. Further, the electrode has a portion attached to an external substance and made of a non-conductive coating. That is, as shown in FIG. 3, the electrode material may be sandwiched between opposing non-conductive materials, or may be encapsulated with a non-conductive material. In FIG. 3, a polyimide may be used as an exemplary non-conductive material. However, the disclosure may not be limited thereto. Other non-conductive materials may be used. As may be seen in FIG. 3, it may be identified that even though the electrode is coated with the non-conductive material, the human body based electrostatic output current may flow well.

In one implementation, the electrode may be patterned to have a plurality of sub-electrodes arranged in a line and spaced from each other by a regular spacing, such that parasitic capacitance is generated between the sub-electrodes to increase a total capacitance of the electrode, thereby maximizing an output current. In this connection, the plurality of sub-electrodes may be arranged in a direction perpendicular to a length direction of each sub-electrode. The regular spacing should be within a spacing range in which parasitic capacitance may occur.

In the most preferred embodiment, the electrode may be patterned to have the plurality of sub-electrodes arranged in a line and spaced from each other by the regular spacing. However, the disclosure may not be limited thereto. The plurality of sub-electrodes may be arranged in a circular, coil, or cross shape.

Figure 4:
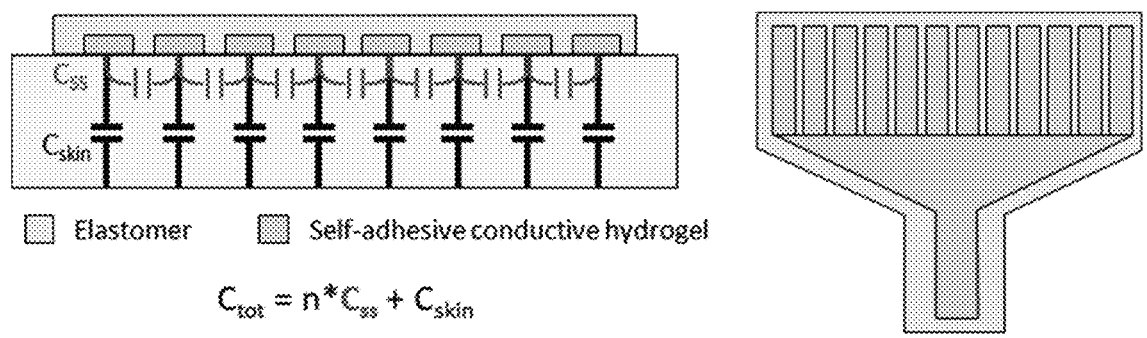
FIG. 4 shows a state in which an output current is maximized by maximizing a capacitance via electrode patterning.

FIG. 4 shows a state in which an output current is maximized by maximizing a capacitance via electrode patterning. As shown in FIG. 4, patterning the electrode may allow a parasitic capacitance CSS to occur between the electrodes such that a total capacitance $C_{tot}$ increases to maximize the output current.

The charging filter is connected to the electrostatic energy harvesting element via the rectifier and thus may be charged to have a positive or negative polarity.

The collecting filter is connected to the electrostatic energy harvesting element via the rectifier and thus may be charged to have a polarity opposite to that of the charging filter. Therefore, when the fine dusts are introduced into the device, the fine dust particles may be charged in the charging filter, and then may be collected into the collecting filter via electrostatic attraction.

Figure 5:
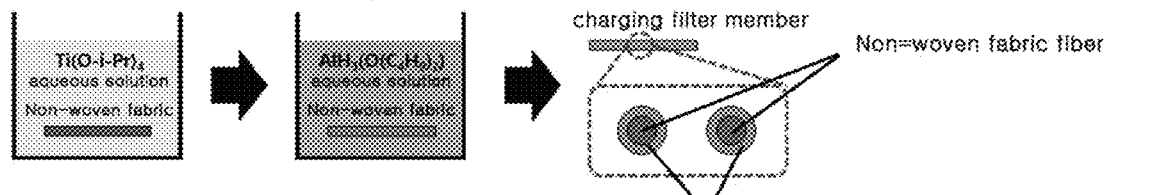
FIG. 5 is a diagram showing a manufacturing process of a charging filter and a collecting filter.
Figure 5:
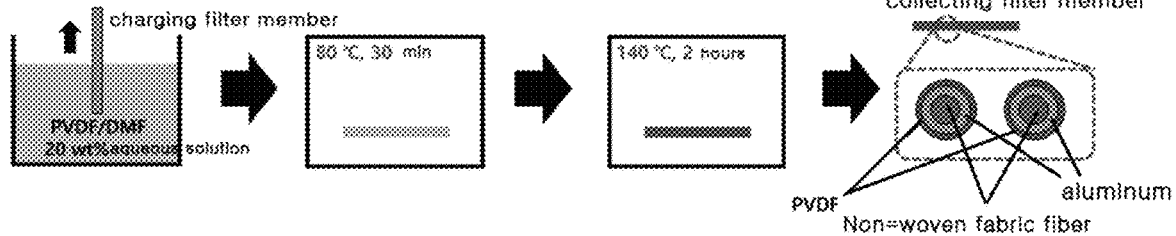

FIG. 5 is a diagram showing a manufacturing process of each of the charging filter and the collecting filter.

In one implementation, the charging filter is prepared by providing filter fibers, and coating a conductive material on the filter fibers. In one example, the charging filter may be prepared by immersing the filter fibers in a Ti(O-i-Pr)$_4$ solution for catalytic treatment, and then immersing the filter fibers in an aluminum precursor AlH$_3$(O(C$_4$H$_9$)$_2$) solution such that aluminum is coated on the filter fibers. In this connection, the fiber may be made of a non-woven fabric.

In one implementation, the collecting filter is prepared by providing filter fibers, and then, coating a conductive material on the filter fiber with, and then additionally coating a dielectric material on the conductive material. In one example, the collecting filter may be prepared by coating aluminum on the filter fibers, then immersing the filter fibers in a PVDF/DMF 20 wt % solution for dip-coating, and drying the filter fibers at 80° C. for 30 minutes, and heat-treating the filter fibers at 140° C. for 2 hours.

The filter fiber may have a woven or non-woven structure, and may include a general material used as the filter such as cellulose and polypropylene. Different materials may be used for the charging filter member fiber and the collecting filter member fiber.

A conductive material of the charging filter member and the collecting filter member may include any material having conductivity such as metals such as gold, silver, copper, conductive polymers, conductive hydrogels, conductive ceramic metal oxides, etc. There is no limitation on a coating scheme thereof.

The dielectric material of the collecting filter member may include any material that has dielectric properties and is free of conductivity, such as ferroelectric polymers such as PVDF and P(VDF-TrFE), dielectric polymers such as PI and PTFE, and ceramic materials. There is no limitation on a coating scheme thereof.

Using the fine dust collecting filter device according to the present disclosure, the fine dust particles inflowing to the filter according to the air flow from an environment out of the filter device are electrically charged to have the same polarity as that of the charging filter member while being in contact with the conductive charging filter member. Then, the charged fine dust particles are collected into the collecting filter member charged to have the opposite polarity to that of the charging filter via electrostatic attraction. In the human body based electrostatic energy harvesting scheme, the electric current is generated in various cases in which the human body and the external substances come into contact with each other and then are separated from each other. For example, when the wearer of the device having a typing, and a hand tapping thereof moves, walks, runs, sits and stands up, the body and the external substance come into contact with each other and are separated from each other. Thus, an electric current is generated according to the transfer of the potential difference due to electrostatic accumulation and polarization. Thus, a permanent operation of the device is possible even after cleaning of the collected fine dusts because the current is continuously supplied to the electrode using the energy harvesting.

The fine dust collecting filter device according to the present disclosure as described above may be used for a mask and may be used semi-permanently.

Further, a fine dust collecting filter device according to an additional embodiment of the present disclosure may include a combination of the fine dust collecting filter device as described above and a mechanical filter. In this case, the mechanical filter may be disposed on one face or each of both opposing faces of the fine dust collecting filter device.

In one example, in an additional embodiment of the present disclosure, a plurality of fine dust collecting filter devices according to the present disclosure may be stacked. Further, a mechanical filter may be disposed on one face or each of both opposing faces of each fine dust collecting filter device.

Figure 6:
FIG. 6 shows application examples of a fine dust collecting filter device according to an additional embodiment of the present disclosure.
Figure 6:
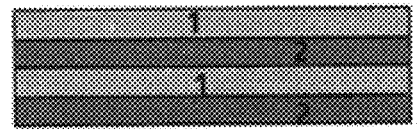
Figure 6:
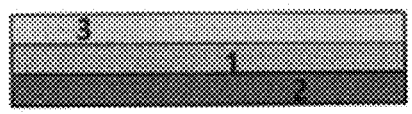
Figure 6:
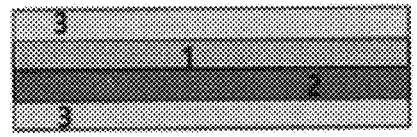

FIG. 6 shows application examples of a fine dust collecting filter device according to an additional embodiment of the present disclosure.

According to the present disclosure, a new concept of a fine dust collecting scheme which may overcome the limitations of the conventional fine dust collecting scheme, such as the short lifespan and the large pressure loss, and may operate at all times may be realized.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A fine dust collecting filter device, comprising:
   an electrostatic energy harvesting element comprising an electrostatic amplifier attached to a part of a body that comes into contact with an external substance and configured to collect and generate current;
   a charging filter connected to the electrostatic energy harvesting element such that the charging filter is electrically charged to have a first polarity and thus electrically charges fine dust particles;
   a collecting filter connected to the electrostatic energy harvesting element such that the collecting filter is electrically charged to have a second polarity opposite to the first polarity; and
   a rectifier disposed between and connected to the electrostatic energy harvesting element, and the charging filter and the collecting filter,
   wherein the electrically charged fine dust particles from the charging filter are collected into the collecting filter due to the second polarity thereof,
   wherein as the electrostatic amplifier comes into contact with the external substance, a surface portion of the electrostatic amplifier that is in contact with the external substance is charged to have a polarity opposite to that of the external substance.

2. The device of claim 1, wherein the electrostatic energy harvesting element further comprises:
   an electrode attached to a body skin; and
   a connection circuit connected to and disposed between the electrode and the rectifier,
   wherein as the body skin comes into contact with the external substance, the body skin is electrically charged to have a polarity opposite to a polarity of the external substance, and wherein a potential difference generated as the body skin is separated from the external substance causes polarization of the body under electrostatic induction, causing the electrode to have charges of a polarity opposite to a polarity of the body skin, thereby generating a current through the connection circuit.

3. The device of claim 1, wherein the electrostatic energy harvesting element further comprises:
an electrode attached to a body skin; and
a connection circuit connected to and disposed between the electrode and the rectifier,
wherein a potential difference generated as the electrostatic amplifier is separated from the external substance causes polarization of the body under electrostatic induction, causing the electrode to have charges of a polarity opposite to a polarity of the surface portion, thereby generating a current through the connection circuit.

4. The device of claim 3, wherein the electrostatic amplifier is made of at least one of polytetrafluoroethylene, polyfluoroalkoxy, polyurethane, and butylated melamine resin.

5. The device of claim 3, wherein the electrode has a portion attached to the body skin and made of a non-conductive coating.

6. The device of claim 5, wherein the electrode has a portion attached to the external substance and made of a non-conductive coating.

7. The device of claim 3, wherein the electrode is patterned to have sub-electrodes arranged in a line and spaced from each other by a regular spacing, such that parasitic capacitance is generated between the sub-electrodes to increase a total capacitance of the electrode, thereby maximizing an output current.

8. The device of claim 7, wherein the sub-electrodes are arranged in a direction perpendicular to a length direction of each sub-electrode.

9. The device of claim 1, wherein the charging filter comprises filter fibers coated with a conductive material.

10. The device of claim 9, wherein the charging filter comprises aluminum coated on the filter fibers.

11. The device of claim 1, wherein the collecting filter comprises filter fibers coated with a conductive material that is coated with a dielectric material.

12. The device of claim 11, wherein the conductive material comprises aluminum.

13. The device of claim 1, wherein the device further comprises a mechanical filter disposed on one face or each of both opposing faces of the device.

14. A filter stack in which a plurality of fine dust collecting filter devices are stacked, wherein each fine dust collecting filter device includes the device of claim 1.

15. A mask comprising the fine dust collecting filter device of claim 1.

* * * * *